(12) United States Patent
O'Regan et al.

(10) Patent No.: US 11,004,579 B2
(45) Date of Patent: May 11, 2021

(54) BREAKAWAY PIN FOR OVERHEAD ELECTRICAL LINES

(71) Applicant: Electrical Materials Company, Genoa City, WI (US)

(72) Inventors: Timothy M. O'Regan, Chicago, IL (US); Timothy J. O'Regan, Park Ridge, IL (US)

(73) Assignee: Electrical Materials Company, Genoa City, WI (US)

( * ) Notice: Subject to any disclaimer, the term of this patent is extended or adjusted under 35 U.S.C. 154(b) by 70 days.

(21) Appl. No.: 16/417,347

(22) Filed: May 20, 2019

(65) Prior Publication Data

US 2020/0373041 A1 Nov. 26, 2020

(51) Int. Cl.
*H01B 17/20* (2006.01)
*H01B 17/24* (2006.01)
*H01B 19/00* (2006.01)
*H02G 7/05* (2006.01)

(52) U.S. Cl.
CPC ............ *H01B 17/20* (2013.01); *H01B 17/24* (2013.01); *H01B 19/00* (2013.01); *H02G 7/053* (2013.01)

(58) Field of Classification Search
CPC ........... H01L 17/20; H01L 17/24; H01L 9/00; H02G 7/053
USPC ...................................................... 174/45 R
See application file for complete search history.

(56) References Cited

U.S. PATENT DOCUMENTS

| D34,450 S | 4/1901 | Locke |
|---|---|---|
| D47,208 S | 4/1915 | Austin |
| D51,982 S | 4/1918 | Grummon |
| 1,546,591 A | 7/1925 | Kyle |
| 1,652,835 A | 12/1927 | Peirce, Jr. |

(Continued)

FOREIGN PATENT DOCUMENTS

| EP | 0051276 A1 | 5/1982 |
|---|---|---|
| FR | 2511182 A1 | 2/1983 |

OTHER PUBLICATIONS

Orient Electric. Link: http://www.oeipower.com/Galvanised-Steel-Spindles-for-Pin-Type-Insulators-pd6237633.html. Visited Nov. 21, 2019. NPL Galvanised Steel Spindles for Pin-Type Insulators. (Year: 2019).

(Continued)

*Primary Examiner* — Timothy J Thompson
*Assistant Examiner* — Michael F McAllister
(74) *Attorney, Agent, or Firm* — Hinshaw & Culbertson LLP

(57) ABSTRACT

An insulator pin for overhead electrical lines has a frangible portion. The pin has an elongate support for attachment to an electrical distribution pole and a body. The body has a connector for an insulator, a frangible portion and an elongate support holding portion from which the elongate support extends. Preferably the elongate support is a bolt. The frangible portion permits the body to break into two pieces for preventing damage to electrical distribution poles from forces transverse to the overhead electrical line. The frangible portion is located between the connector and the elongate support holding portion. The insulator pin may be attached to an electrical distribution pole to protect the pole from forces transverse to an overhead electrical lines supported by the pole. A method of making the insulator pin by molding is disclosed.

25 Claims, 13 Drawing Sheets

(56) References Cited

U.S. PATENT DOCUMENTS

| | | | |
|---|---|---|---|
| 2,149,760 A | | 3/1939 | Carlson |
| 2,207,008 A * | | 7/1940 | Hocher .................. H01B 17/20 403/283 |
| 2,207,009 A * | | 7/1940 | Hocher .................. H01B 17/20 403/281 |
| 2,218,487 A * | | 10/1940 | Terman .................. H01Q 21/20 343/826 |
| 2,297,600 A * | | 9/1942 | Williams ............... H01B 17/20 174/205 |
| 2,304,483 A * | | 12/1942 | Smith ..................... H01B 17/20 174/194 |
| 2,381,676 A * | | 8/1945 | Mathews ............... H01B 17/22 174/156 |
| 2,526,917 A * | | 10/1950 | Wheeler .................. H02G 7/12 174/146 |
| 2,535,423 A * | | 12/1950 | Vaidemar ................. H01T 4/14 174/140 R |
| 3,061,667 A * | | 10/1962 | Markley ................. H01B 17/20 174/211 |
| 3,637,244 A * | | 1/1972 | Strizki ..................... E01F 9/635 52/98 |
| 4,409,433 A | | 10/1983 | Willem |
| 4,940,857 A | | 7/1990 | Giroux |
| D326,257 S | | 5/1992 | Lee |
| D330,849 S | | 11/1992 | Stubbersfield |
| 5,413,443 A * | | 5/1995 | Aghamehdi ........... H01B 17/20 174/165 |
| 5,942,731 A * | | 8/1999 | Rogerson ............... H01B 17/20 174/158 R |
| D458,223 S | | 6/2002 | Gagne |
| D474,152 S | | 5/2003 | Burdick |
| 6,667,442 B1 | | 12/2003 | Hilligoss |
| D494,136 S | | 8/2004 | Vesecky |
| 7,290,748 B2 | | 11/2007 | McDonald |
| 8,389,861 B2 * | | 3/2013 | Simnacher ............... H02G 1/02 174/137 R |
| 2005/0081458 A1* | | 4/2005 | McDonald ............... H02G 7/02 52/98 |
| 2012/0193124 A1* | | 8/2012 | Simnacher ............... H02G 1/02 174/137 R |

OTHER PUBLICATIONS

Indiamart. Link: https://www.indiamart.com/bhagya-lakshmi-electiricals/insulator-pin.html. Visited Nov. 21, 2019. Insulator Pin. (Year: 2019).

Chance 5-40; PINS Forged Steel Pins and PINS High Voltage Forged Steel Pins; 1 page.

* cited by examiner

BREAKAWAY PIN FOR OVERHEAD ELECTRICAL LINES

FIELD OF THE INVENTION

The present invention relates to a frangible insulator pin for overhead electrical lines, an overhead electrical pole using the pin, and a method of manufacturing the pin.

BACKGROUND

Overhead electrical power lines are commonly used to provide electricity. The electrical lines (primary conductors) are supported overhead by distribution lines poles, which are often wood. The poles typically have cross arms. Insulator pins are typically fastened to the cross arms through holes in the cross arm. The insulators have a threaded socket which attach to the insulator pins. The electrical lines are attached to the insulator, typically in a trough at the top of the insulator, which can be of the pin or post-type.

Wind storms, falling trees and ice storms can bring down the conductor supporting structure (which may include the cross arms, braces and poles) plus bring the high voltage conductor to the earth. The downed primary conductor may arc to ground and initiate a fire, if arcing is near flammable material. Downed primary conductors also typically result in extended electrical outages which may be particularly severe if the pole has been broken.

A need exists for a way to minimize the damage and safety risks caused by wind storms and the like to the overhead electrical system. A need exists to minimize the associated cost of electrical service restoration and duration of service interruptions.

Pins often have lead (Pb) or soft plastic threads for attachment to the insulator or alternatively the insulator has threads lined with lead or plastic. The purpose of the lead is to provide a soft interface between the ceramic or glass insulator and the hard metal of the insulator pin to prevent breakage of the ceramic insulator. However, lead is toxic; no safe level is known in the human blood stream. Lead is known to cause brain damage for well over a century.

A need therefore exists for insulator pins without lead threads, but which protect the insulator pin from damage.

SUMMARY OF THE INVENTION

A first embodiment of the invention is an insulator pin for overhead electrical lines. The pin has an elongate support for attachment to an electrical distribution pole. The support is typically metallic. It can be a threaded rod, a bolt, a bar, or a strut. It can be straight, bent, or curved. The pin has a body. The body has a connector for connecting to an insulator for supporting an overhead electrical line, an elongate support holding portion from which the elongate support extends, and a frangible portion at which the body can break into two pieces for preventing damage to electrical distribution poles from forces transverse to the overhead electrical line. The frangible portion is located between the connector and the elongate support holding portion. The body is preferably made from a plastic and is unitary. Preferably, the plastic includes or is fiber-reinforced nylon.

Preferably, the elongate support includes a threaded rod. The rod may be partially or fully threaded along its length.

Preferably, the body has a tapered portion between the connector and the frangible portion. The tapered portion is widest in proximity to the frangible portion. The tapered portion may be frusto-conical.

Preferably, the body is narrowest at a first width of the frangible portion. The frangible portion also has a second width taken perpendicularly to the first width. The second width is bigger than the first width.

Preferably, the elongate support holding portion has a surface for mounting the pin on a cross arm of the pole. The elongate support extends from the surface for mounting.

Preferably, the elongate support comprises a bolt having a head, which is located inside the elongate support holding portion. The head may be square, circular or hexagonal, for example.

Preferably, the connector is threaded for threaded connection to a pin insulator or a post insulator.

A second embodiment of the invention is an electrical distribution pole protected from forces transverse to an overhead electrical line supported by the pole. The pole has an insulator pin attached to the pole by an elongate support and an insulator attached to a connector of the insulator pin. The insulator pin has a body. The body has the connector, an elongate support holding portion and a frangible portion for preventing damage to the pole from forces transverse to the overhead electrical line. The elongate support extends from the elongate support holding portion. The frangible portion is located between the connector and the elongate support holding portion. The insulator has a channel for supporting the overhead electrical line. Preferably, there is an electrical line in the channel. A circumference of the electrical line may be completely surrounded in the channel or the channel can be open at its top. The pole may have an elongate body. Conventionally, the body is substantially cylindrical with a round or polygonal cross-section and frequently with a slight taper. The body may be made from any suitable material including wood or metal. The insulator pin in the second embodiment may be the insulator pin of the first embodiment.

Preferably, the pole has a cross arm attached to the pole. The pin has a threaded rod extending from the second end and through the cross arm. Additionally, the elongate support holding portion has a surface supporting the pin on the cross arm.

Preferably, the insulator is a pin insulator, a post insulator or a suspension insulator.

Preferably, the frangible portion is frangible in a direction transverse to the electrical line. The body may have an alignment mark which is substantially parallel or parallel to the electrical line. Preferably, the body is most frangible in a direction substantially perpendicular or perpendicular to the electrical line.

The third embodiment is a method of making an insulator pin for overhead lines. The method includes (1) placing a portion of a bolt including a head of the bolt in a cavity of a mold, (2) injecting a resin into the cavity and around the portion of the bolt, and (3) setting or cooling the injected resin to solidify around the portion of the bolt. The cavity is shaped to form a body around the portion of the bolt. The body has a connector for connecting to an insulator for supporting an overhead electrical line, a bolting holding portion and a frangible portion at which the body can break into two pieces for preventing damage to electrical distribution poles from forces transverse to the overhead electrical line. The frangible portion is located between the connector and the bolt holding portion. The bolt extends from the bolt holding portion. The insulator pin in the third embodiment may be the insulator pin of the first embodiment.

Preferably, the resin is a fiber-reinforced nylon resin.

Preferably, the placing of the portion of the bolt includes placing the bolt head inside a portion of the mold cavity shaped to form the bolt holding portion.

Preferably, the portion of the mold cavity has a first surface for forming a second surface on the bolt holding portion, the second surface for supporting the pin on a cross arm of the pole. The bolt extends through the first surface and out of the mold cavity.

DETAILED DESCRIPTION OF THE INVENTION

Figure 12:
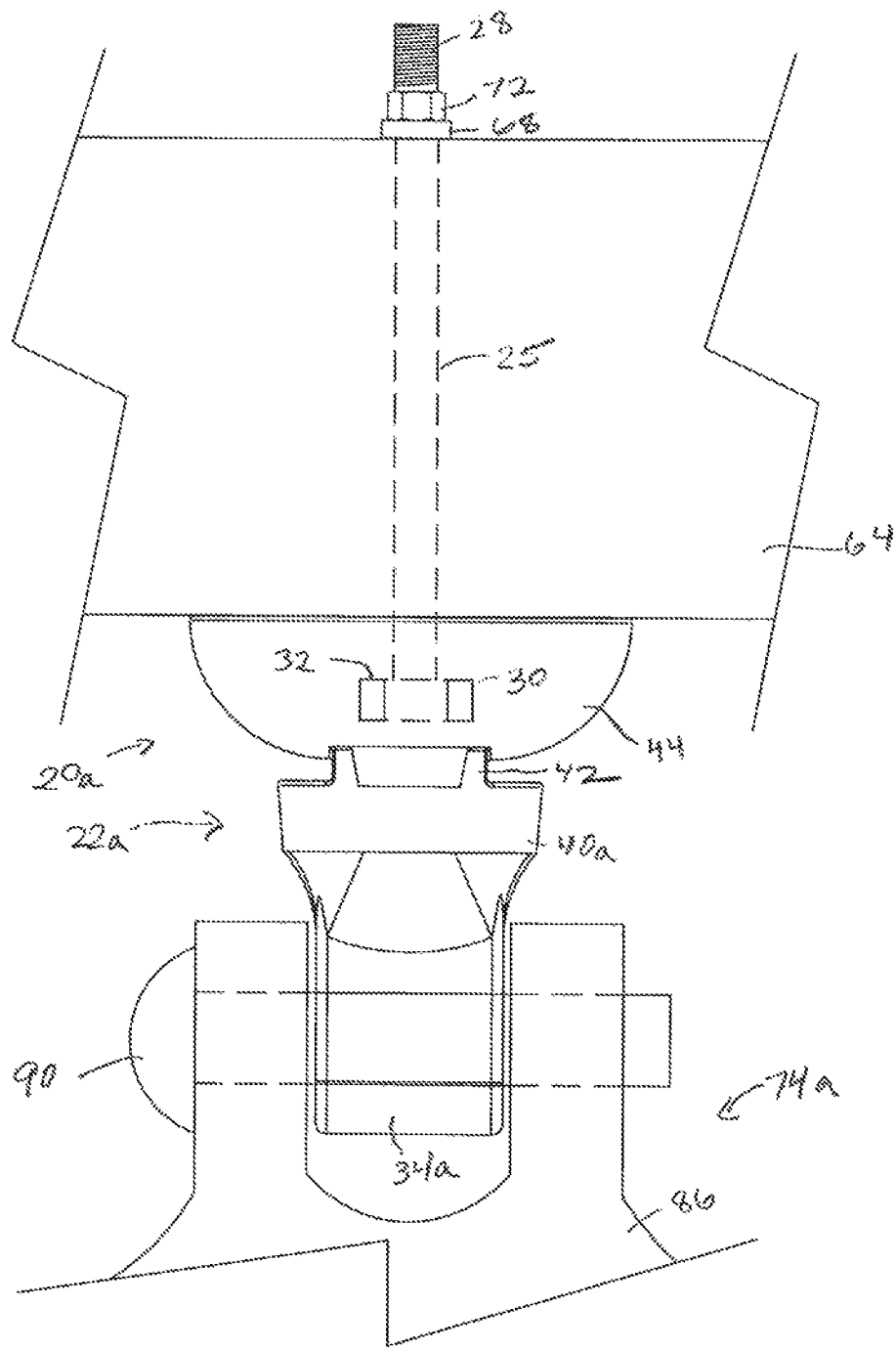
FIG. 12 is a schematic view of the second insulator pin in use along a longitudinal direction of the overhead line of FIG. 11.

In a first embodiment of the invention, an insulator pin 20 is discussed with reference to FIGS. 1-6. Insulator pin 20 has a body 22 and an elongate support 24, which is preferably a bolt 25. Elongate support 24 may take many forms to match the needs of electric utilities including rods, bars and struts. Elongate support 24 is typically straight, but it can also be curved to match the needs of electric utilities. It is contemplated that in some cases elongate support 24 could be removable from body 22 permitting elongate support 24 to be replaced. For example, body 22 could have a threaded socket for accepting a threaded rod. Preferably, bolt 25 has a non-threaded shank portion 26, a threaded shank portion 28 and a head 30. Head 30 is located within body 22. Head 30 may be hexagonal, round or square in cross-section. Square is preferred. Head 30 preferably has a flat underside 32 as shown in FIG. 12.

Body 22 is preferably molded and is unitary. Body 22 has a connector 34 at a first end 36. Connector 34 as shown is threaded, but may take other forms as necessary. Body 22 has a second end 38 from which support 24 extends. Moving from first end 36 towards second end 38, body 22 has connector 34, a tapered portion 40, a frangible portion 42 and an elongate support holding portion 44 (sometimes referred to as a bolt holding portion). Tapered portion 40 is narrowest proximate connector 34 and widest proximate frangible portion 42. Frangible portion 42 is designed to break when a force substantially perpendicular to the electrical line, illustrated by vectors 46a and 46b in FIG. 5, exceeds a predetermined value of 400 lbs, 600 lbs or 800 lbs. In particular, frangible portion 42 is designed (predetermined) to not break from a force substantially parallel to the electrical line of less than 1,000, 1400 or 1,800 lbs. As can be appreciated, the predetermined values are a function of a number of variables including the distance of the conductor supported by to pin to frangible portion 42 and the specific application in which pin 20 is used. Frangible portion 42 may be made frangible by any suitable means including having a width 47 which is narrower than the width elsewhere in body 22. Frangible portion 42 has a width 48 which is greater than width 47 to provide greater resistance to forces parallel to the electrical line. Alternatively, frangible portion 42 may be frangible because of passages (not shown) perpendicular to the plane of the paper in FIG. 2A. Width 47 and 48 may vary based on the material of body 22 and the specific application for pin 20. Width 48 may be substantially the same as the greatest width of tapered portion 40. Width 47 may be less than 75%, preferably less than 66% of width 48.

Figure 1:
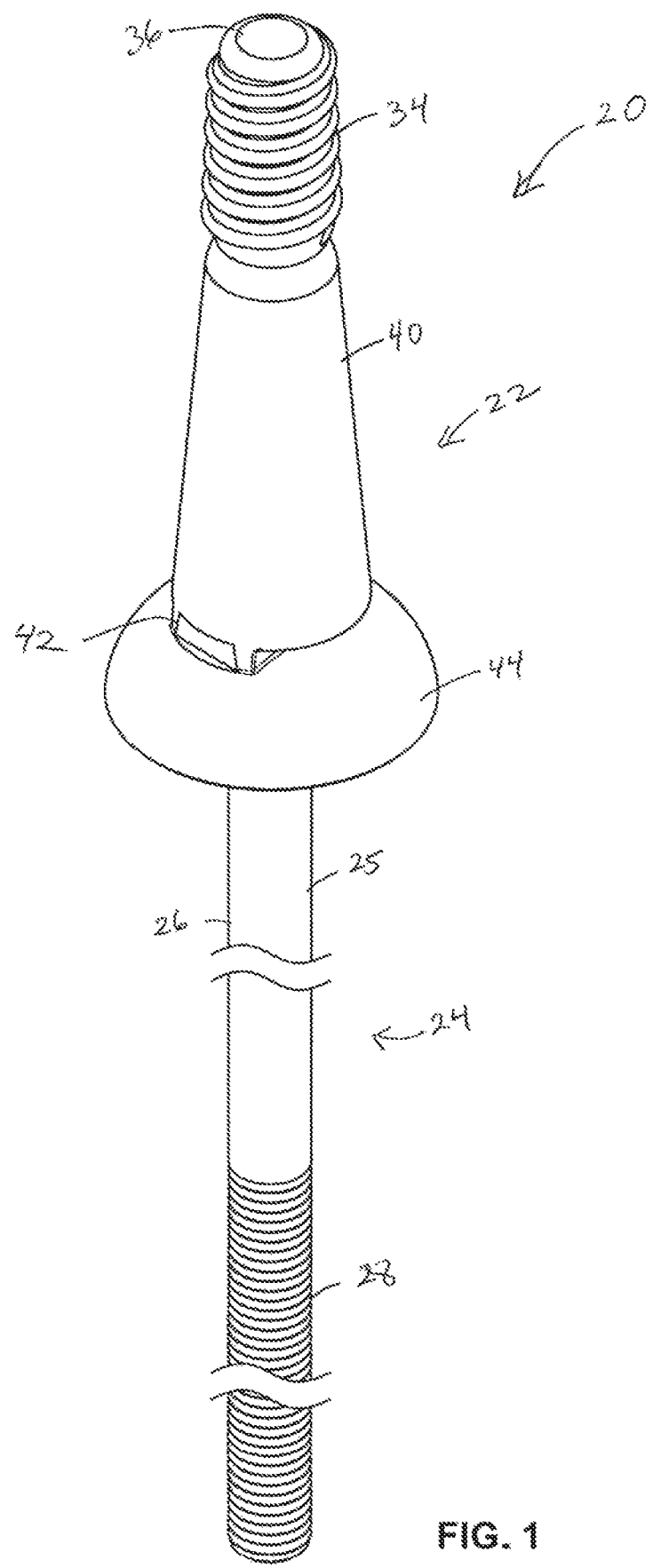
FIG. 1 is a perspective view of a first insulator pin.
Figure 2A:
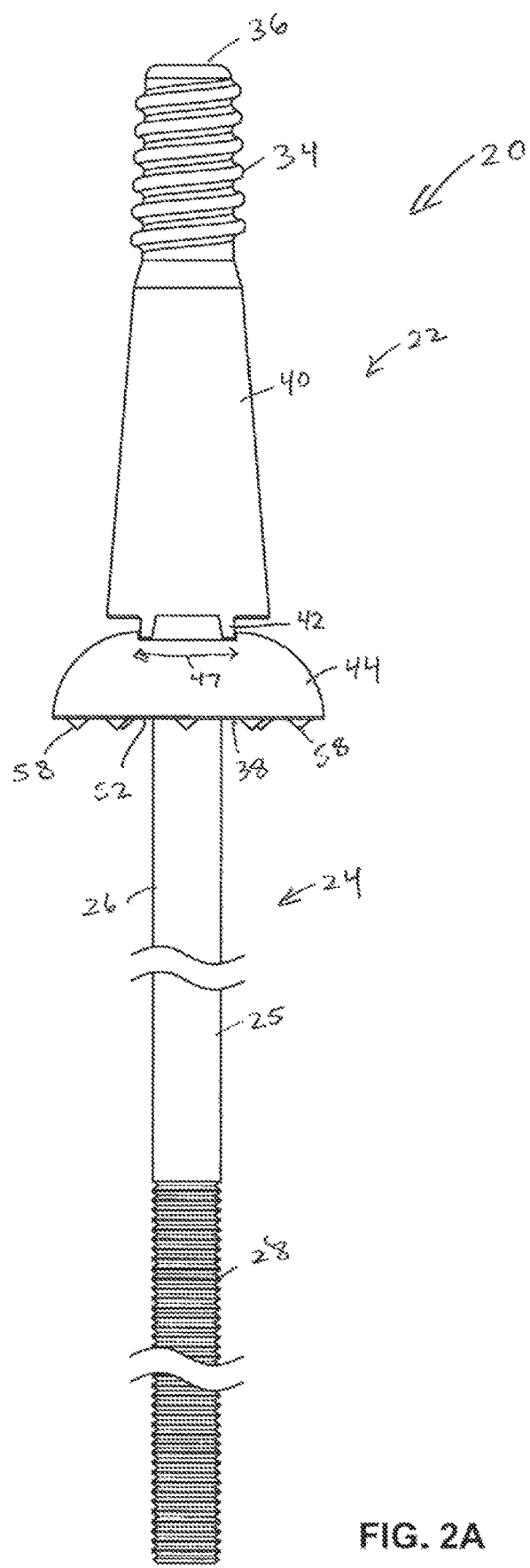
FIG. 2A is a front elevation view of the first insulator pin.
Figure 2B:
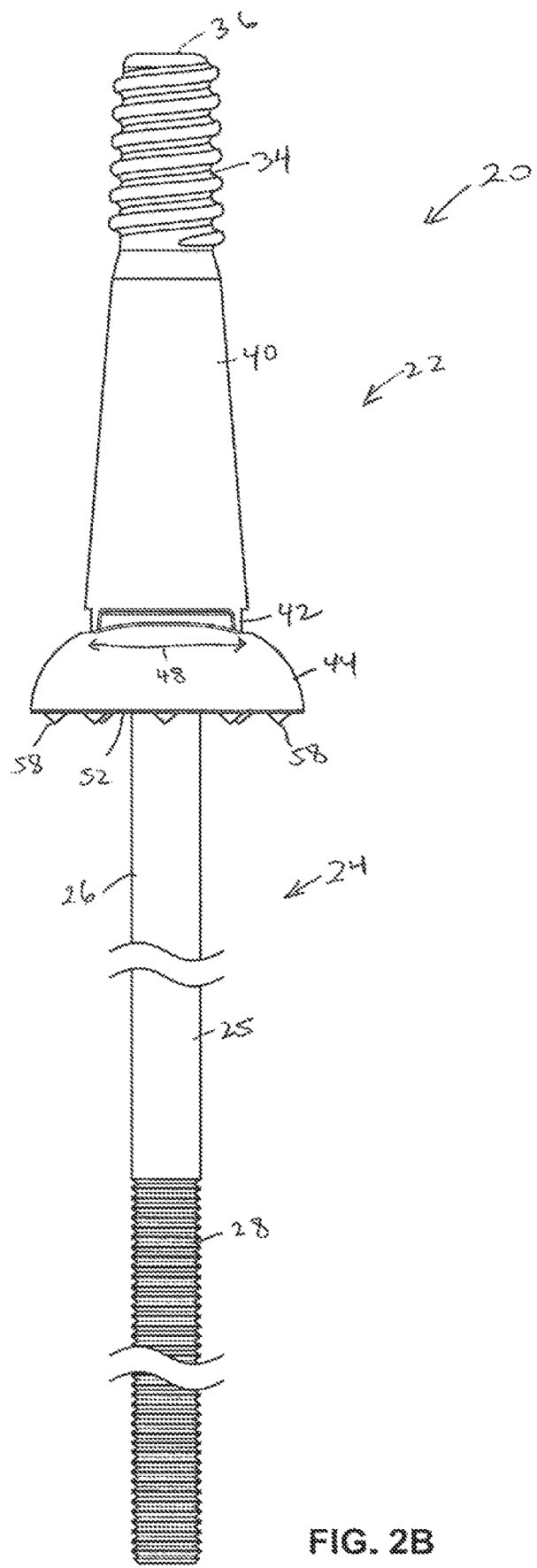
FIG. 2B is a side elevation view of the first insulator pin.
Figure 3:
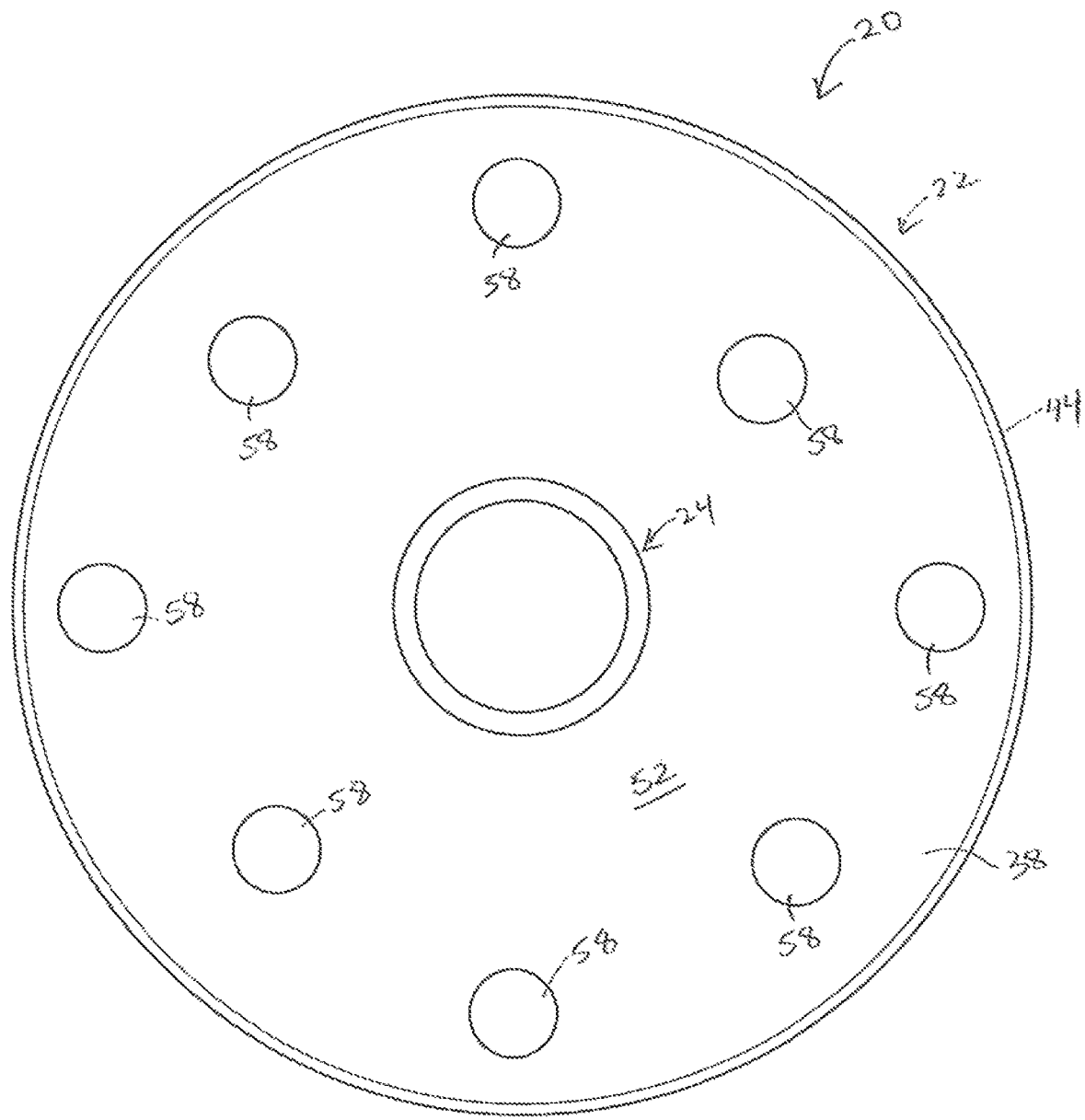
FIG. 3 is a bottom plan view of the first insulator pin.
Figure 4A:
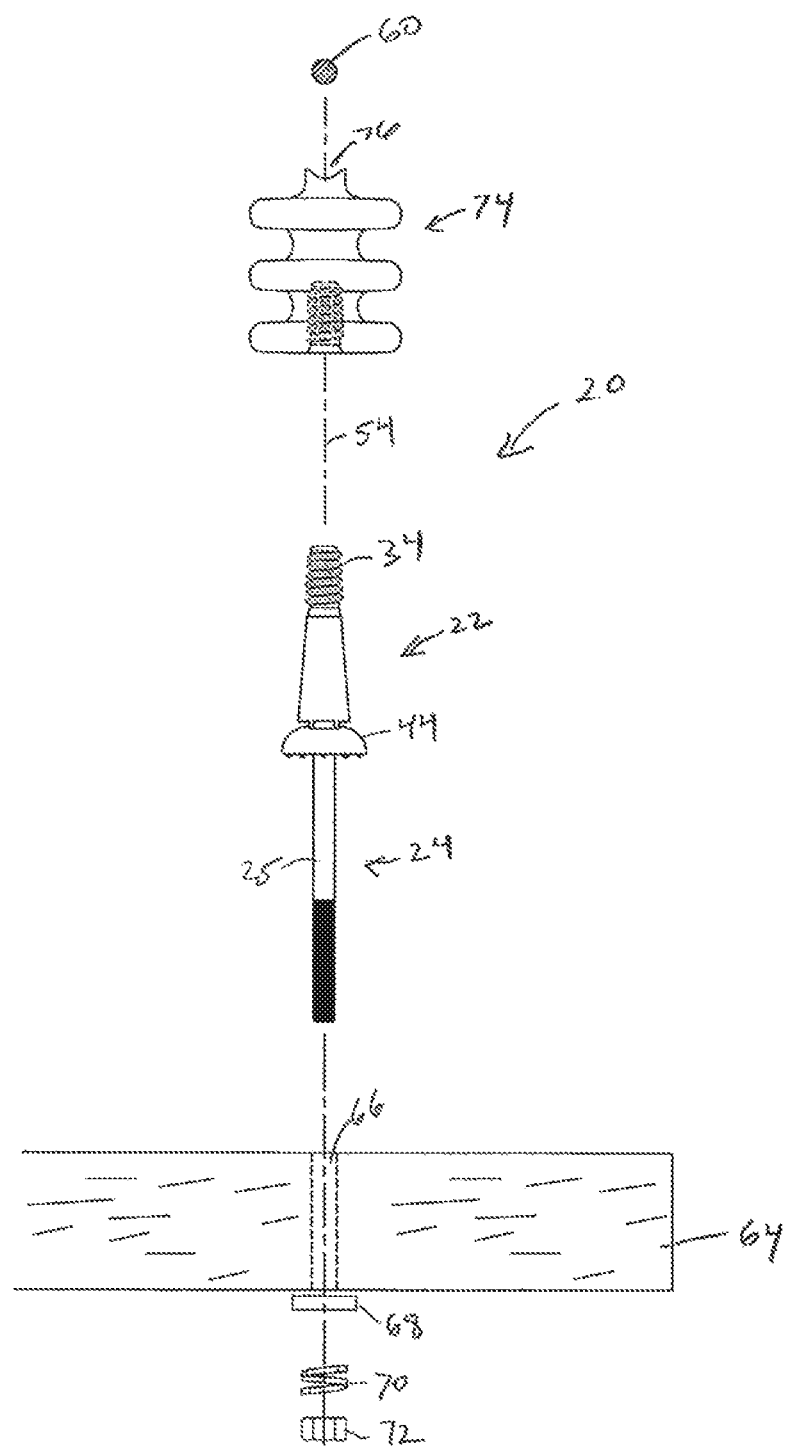
FIGS. 4A and 4B are schematic exploded views of the first insulator pin in use taken parallel to an electrical conductor supported by the pin and transverse to the electrical conductor, respectively.
Figure 4B:
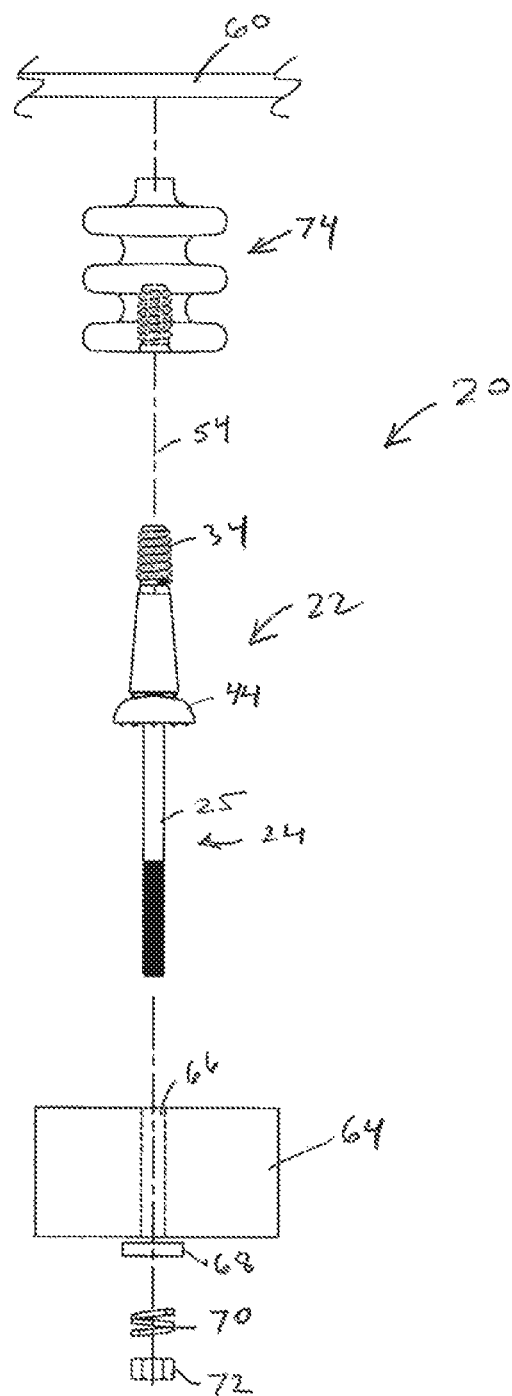
Figure 5:
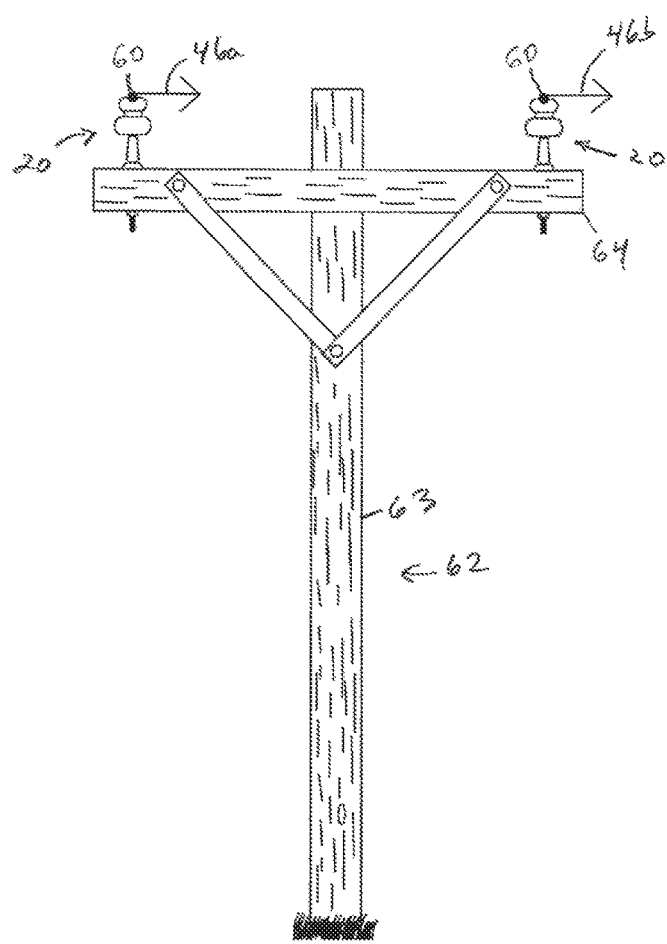
FIG. 5 is a schematic view of the first insulator pin in use along a longitudinal direction of two overhead electrical lines.

Elongate support holding portion 44 has surface for mounting 52. As shown, surface for mounting 52 is substantially flat apart from certain protuberances (in which case it may also be referred to as flat surface), but surface for mounting 52 may take other shapes to match the surface to which surface for mounting 52 is mounted to. Elongate support 24/bolt 25 extends perpendicularly from surface of mounting 52. Typically, the centerline of bolt 25 and the centerline of body 22 will be aligned as shown in FIGS. 4A and 4B along broken line 54 in which case first end 36 is directly opposed to second end 38. Alternatively, the centerlines will not be aligned to match the needs of electric utilities in which case they may be perpendicular and first end 36 is generally opposed to second end 38, but not directly so. Elongate support holding portion 44 may be dome shaped, conical or substantially frusto-pyramidal. The dome shape is preferred as it minimizes corona erosion since there are no sharp edges. Head 30, shown in dashed lines in FIG. 12, is contained inside elongate support holding portion 44 so that bolt 25 is securely attached to body 22. It is contemplated that body 22 and elongate support 24 could be attached in a different fashion or not be attached at all because they are unitary being made in the same mold. Because elongate support holding portion 44 is typically the widest part of pin 20, it may bear a visual indicia 56 (shown in FIG. 11) for showing the proper alignment of pin 20 (alignment direction) relative to a conductor 60 to be supported by pin 20. Head 30 is shown in the figures as being square in a particular orientation, but other orientations are possible.

Body 22 may also have features to assist with the installation of the pin 20. Body 22 can have flats (not shown) for a wrench to grip. Alternatively body 22 may have and oblong or oval cross-section for a wrench to grip. As illustrated, surface of mounting 52 has protuberances 58, but is otherwise flat. Protuberances 58 are pyramidal or conical to embed in a wooden cross arm of an electrical pole so that pin 20 will resist turning during installation of pin 20 onto the cross arm.

In a second embodiment of the invention, as shown in FIGS. 4A-6, insulator pin 20 is used to support electrical conductors 60 while protecting pole 62. Pole 62 has an elongate pole body 63, which may be made from any suitable material, the most common ones being wood or metal. Pole 62 has one or more cross arms 64, attached to pole body 63, to which one or more pins 20 are mounted. Alternatively or additionally, one or more pins 20 may be mounted directly to pole body 63. Pole 62 is typically installed into the ground (as illustrated).

Pin 20 is secured to cross arm 64 by a circular washer 68, a lock washer 70 and a nut 72. Typically, washer 68 is a circular SAE ⅝" I.D. hot dipped galvanized washer and lock washer 70 is a ⅝" type "MW" double spring lock washer. Typically, nut 72 is a ⅝" hot dipped galvanized square head nut. For mounting to the pole, surface for mounting 52 is substantially flat apart from protuberances 58 to best match the flat top surface of cross arm 64. Bolt 25 extends through a passage 66 shown by dashed lines in FIG. 4A in cross arm 64. Nut 72 is threaded onto bolt 25 and typically tightened so that lock washer is fully compressed.

Pin 20 is attached to an insulator 74 via connector 34. Insulator 74 may be of any suitable type including suspended, post or pin. A typical pin insulator is illustrated in U.S. Pat. No. 4,940,857. As shown in FIGS. 4A and 4B, connector 34 is threaded and insulator 74 is correspondingly threaded. At the top of insulator 74 is a channel 76 for supporting conductor or electrical line 60. Conventionally, conductor 60 may be tied to insulator 74 so that conductor 60 stays within channel 76 since channel 76 has an open top. Insulator 74 may have two perpendicular channels 76 (not shown).

FIGS. 7-12 illustrate another variation of an insulator pin, insulator pin 20a. Because pin 20a is similar to pin 20, this discussion focuses on how pin 20a differs from pin 20. In particular, pin 20a has a body 22a having connector 34a and a tapered portion 40a. Connector 34a has a passage 84 for a pin 90 to pass through body 22a. Tapered portion 40a as shown is squatter than tapered portion 40.

Figure 11:
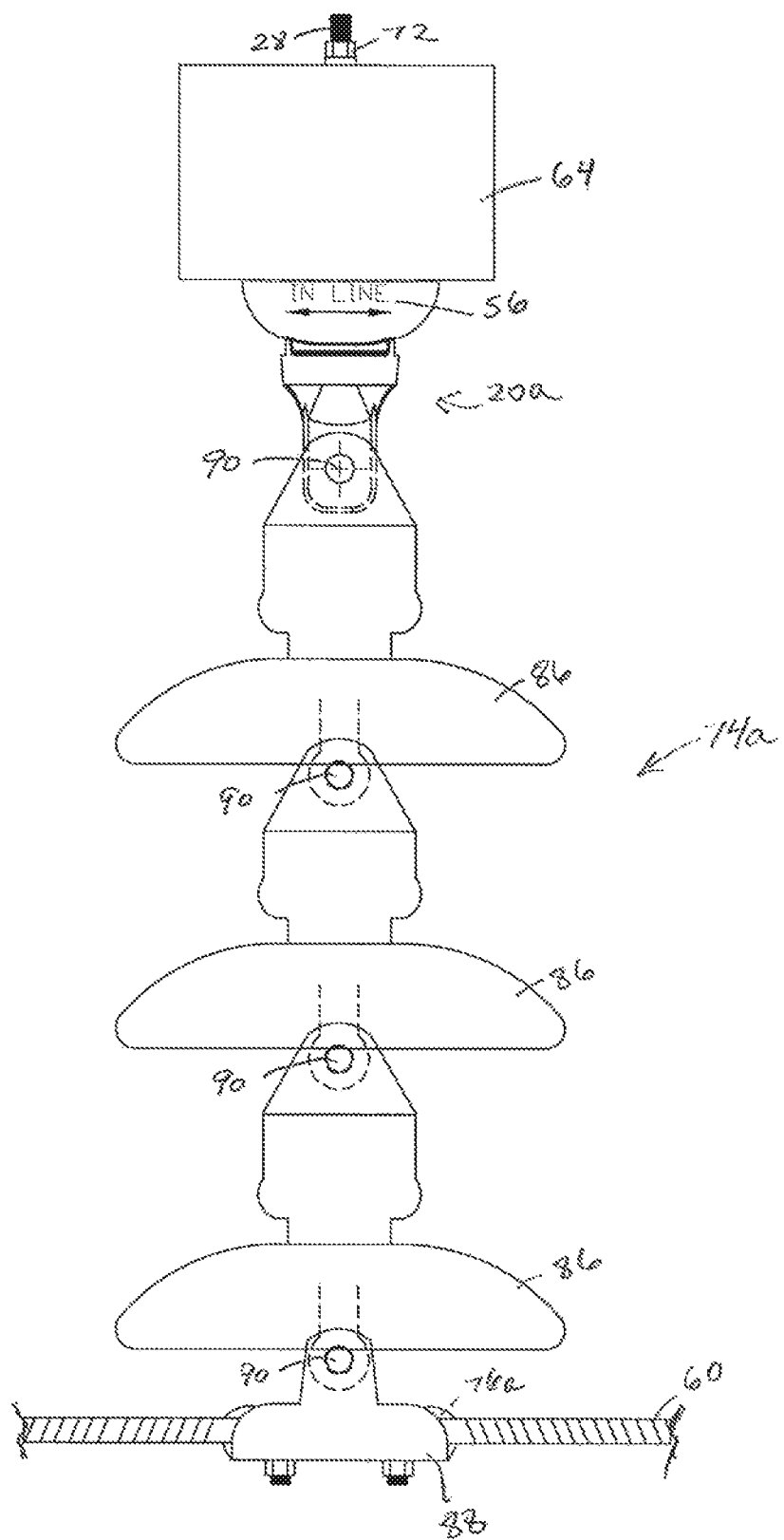
FIG. 11 is a schematic view of the second insulator pin in use see in a transverse direction to an overhead electrical line.

FIGS. 11-13 show how insulator pin 20a is used to support electrical conductor 60. Insulator pin 20a is mounted to cross arm 64 using flat circular washer 68, nut 72 (illustrated as being hexagonal, but may be square or other suitable shape) and preferably lock washer 70 (omitted from FIGS. 11 and 12 for simplicity, but shown in FIG. 10). Pin 20a like pin 20 has an elongate support holding portion 44 having a surface for mounting 52. As Illustrated, surface for mounting 52 is flat, but is mounted to underside of cross arm 64. Insulator 74a is of the suspension type. Insulator 74a may be a combination of modular and discrete insulators 86, which is a conventional arrangement for suspension-type insulators. Insulator 74a has a channel 76a inside a cradle 88 suspended from the bottom most insulator 86. Channel 76a completely surrounds a portion of conductor 60. Insulators 86 are connected to each other, to cradle 88 or connector 34a with a number of pins 90.

Any suitable material may be used for insulator pins 20 and 20a. Body 22 may be made of any suitable plastic for the application such as long life in the outdoors and high strength. A preferred material is fiber-reinforced nylon. The nylon may be nylon 66, nylon 6, nylon 510, nylon 1, 6, for example, and mixtures thereof. Preferred fibers are fiberglass, carbon fiber, aramid (e.g. Kevlar) or mixtures thereof. The fibers are preferably long filament. The plastic may contain a variety of additives including ultraviolet inhibitors and processing aids. The percentage of fiber in the nylon may be 20-70%, preferably 30-55%, more preferably 35-45% and most preferably 38.5%-41.5% (all percentages by weight). Bolt 25 may be made from any suitable material including hot dipped galvanized steel and stainless steel. Typically, pins 20 and 20a may vary in length between 5.5-7" (139-178 mm).

In a third embodiment of the invention, a method of making an insulator pin for overhead lines is provided. The method includes (1) placing a portion of a bolt including a head of the bolt in a cavity of a mold, (2) injecting a resin into the cavity and around the portion of the bolt, and (3) setting or cooling the injected resin to solidify around the portion of the bolt. The cavity is shaped to form a body around the portion of the bolt. The body has a connector for connecting to an insulator for supporting an overhead electrical line, a bolt holding portion and a frangible portion at which the body can break into two pieces for preventing damage to electrical distribution poles from forces transverse to the overhead electrical line. The frangible portion is located between the connector and the bolt holding portion from which the bolt extends. The insulator pin in the third embodiment may be the insulator pin 20 or 20a.

Preferably, the resin is a fiber-reinforced nylon resin.

Preferably, the placing of the portion of the bolt includes placing the bolt head inside a portion of the mold cavity shaped to form the bolt holding portion. As a result, in the finished pin, the bolt head is located in the bolt holding portion.

Preferably, the portion of the mold cavity has a first surface for forming a surface for mounting on the bolt holding portion for supporting the pin on a cross arm of the pole. The bolt extends through the first surface and out of the mold cavity. As a result the bolt extends from the second flat surface in the finished pin. The first surface may have indentations for forming protuberances 58 on the second surface.

Figure 6:
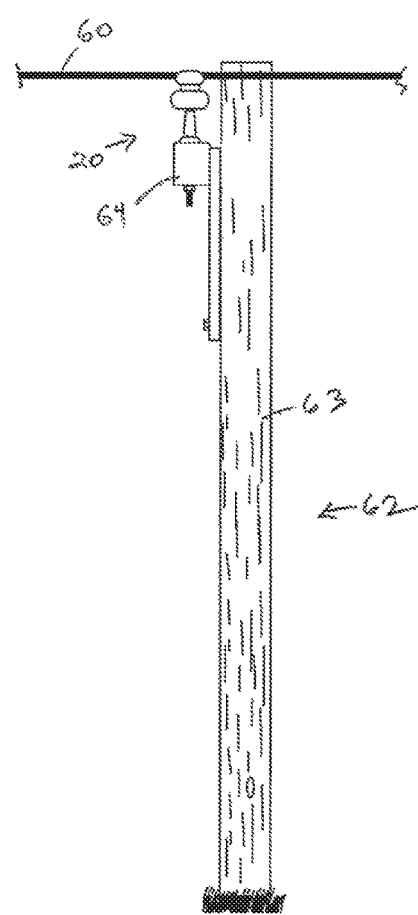
FIG. 6 is a schematic view of the first insulator pin in use along a transverse direction perpendicular to the longitudinal direction of FIG. 5.
Figure 7:
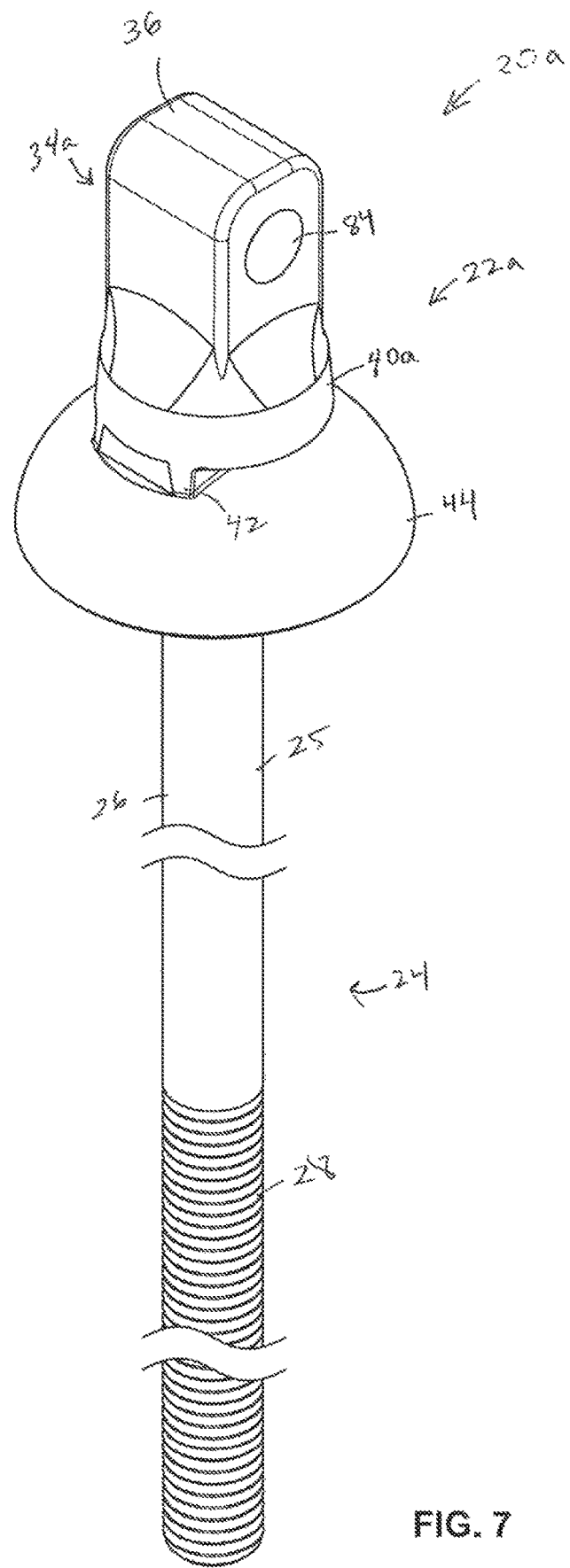
FIG. 7 is a perspective view of a second insulator pin.
Figure 8:
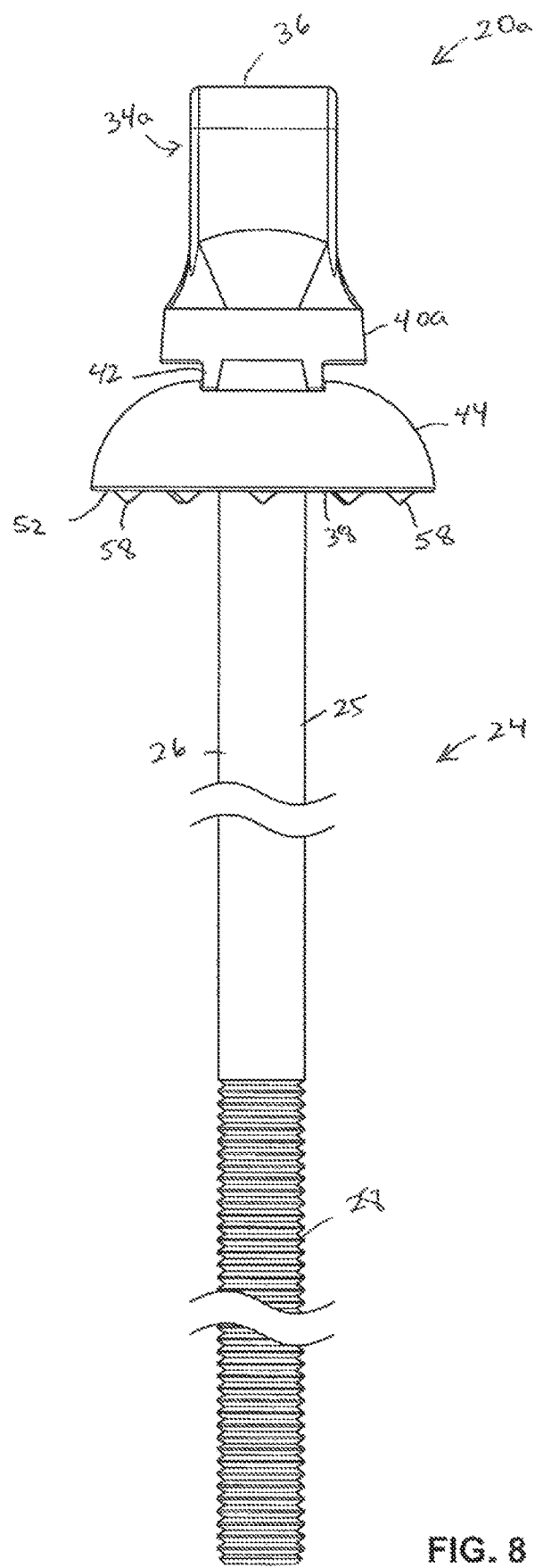
FIG. 8 is a front elevation view of the second insulator pin.
Figure 9:
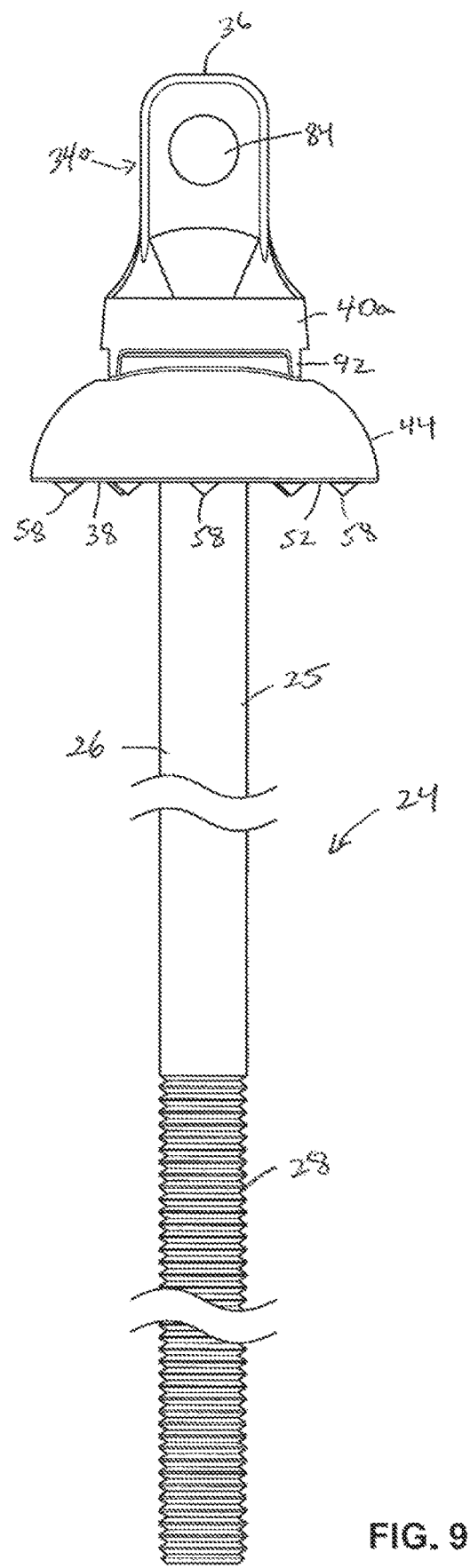
FIG. 9 is a side elevation view of the second insulator pin.
Figure 10:
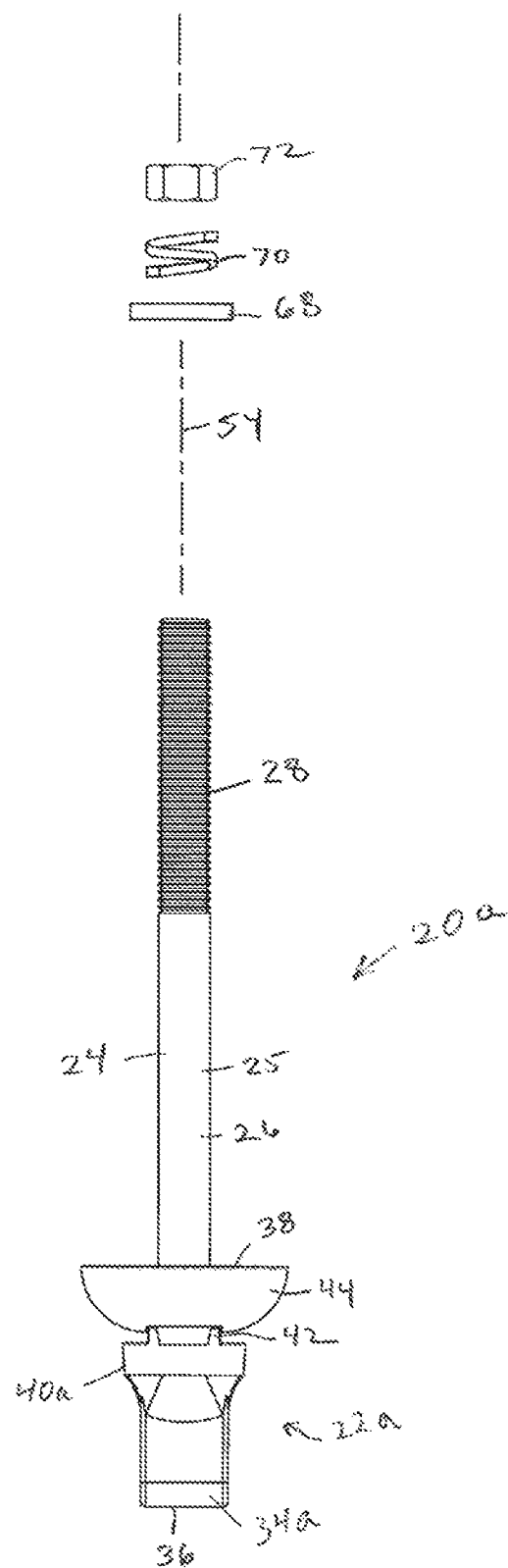
FIG. 10 is a schematic view of the second insulator pin with mounting hardware.

Electrical lines are illustrated in FIGS. 4B, 6 and 11 as being perfectly straight. As one of skill in the art would appreciate, electrical lines typically sag between poles (for simplicity, only a single pole is shown) and may bend horizontally because it is not possible to align the pins on different poles perfectly. The terms parallel and perpendicular are intended to encompass, but be broader than geometric parallel or geometric perpendicular. As used herein, the terms parallel and perpendicular cover the normal range of deviation from geometric parallel and geometric perpendicular in the electric utility industry. As used herein, substantially parallel means parallel plus or minus 15 degrees. As used herein, substantially perpendicular means perpendicular plus or minus 15 degrees.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. An insulator pin for overhead electrical lines, the pin comprising:
   an elongate support for attachment to an electrical distribution pole; and
   a body having an insulator connector for connecting to an insulator for supporting an overhead electrical line, an elongate support holding portion from which the elongate support extends, and a frangible portion at which the body can break into a plurality of pieces for preventing damage to electrical distribution poles from forces transverse to the overhead electrical line, the frangible portion between the insulator connector and the elongate support holding portion.

2. The pin of claim 1, wherein the elongate support comprises a threaded rod.

3. The pin of claim 1, wherein the body has a tapered portion between the connector and the frangible portion, the tapered portion being widest in proximity to the frangible portion.

4. The pin of claim 1, wherein the body is narrowest at a first width of the frangible portion.

5. The pin of claim 3, wherein the frangible portion has a second width taken perpendicularly to the first width, the second width being bigger than the first width.

6. The pin of claim 1, wherein the elongate support holding portion has a surface for mounting the pin on a cross arm of the pole, the elongate support extending from the surface for mounting and the frangible portion located between the surface for mounting and the insulator connector.

7. The pin of claim 1, wherein the elongate support comprises a bolt having a head, the head located inside the elongate support holding portion.

8. The pin of claim 1, wherein the connector is threaded for threaded connection to a pin insulator or a post insulator, plastic.

9. The pin of claim 1, wherein the body is composed of plastic.

10. An electrical distribution pole protected from forces transverse to an overhead electrical line supported by the pole, the pole comprising:
an insulator pin attached to the pole by an elongate support, the insulator pin having a body having a connector for connecting to an insulator, an elongate support holding portion from which the elongate support extends, and a frangible portion at which the body can break into a plurality of pieces for preventing damage to the pole from forces transverse to the overhead electrical line, the frangible portion between the connector and the elongate support holding portion; and
an insulator attached to the connector of the insulator pin, the insulator having a channel for supporting an overhead electrical line.

11. The pole of claim 10, further comprising a cross arm, the cross arm attached to the pole, the elongate support comprising a threaded rod extending from the elongate support holding portion second end and through the cross arm.

12. The pole of claim 11, wherein the elongate support holding portion has a surface supporting the pin on the cross arm and the frangible portion is located between the surface and the insulator connector.

13. The pole of claim 10, wherein the insulator is a pin insulator, a post insulator or a suspension insulator.

14. The pole of claim 10, wherein the frangible portion is frangible in a direction transverse to the electrical line.

15. The pole of claim 14, wherein the body has an alignment mark, the alignment mark substantially parallel to the electrical line.

16. The pole of claim 14, wherein the body is most frangible in a direction substantially perpendicular to the electrical line.

17. A method of making an insulator pin for overhead lines, the method comprising:
placing a portion of a bolt including a head of the bolt in a cavity of a mold, the cavity being shaped to form a body around the portion of the bolt;
injecting a resin into the cavity and around the portion of the bolt; and
setting or cooling the injected resin to solidify the body around the portion of the bolt, wherein the body has a first end, a connector for connecting to an insulator for supporting an overhead electrical line, a bolt holding portion, the bolt extending from the bolt holding portion, and a frangible portion at which the body can break into a plurality of pieces for preventing damage to electrical distribution poles from forces transverse to the overhead electrical line, the frangible portion between the connector and the bolt holding portion.

18. The method of claim 17, wherein injecting a resin comprises injecting a fiber-reinforced nylon resin.

19. The method of claim 17, wherein the placing of the portion of the bolt includes placing the bolt head inside a portion of the mold cavity shaped to form the bolt holding portion.

20. The method of claim 17, wherein the portion of the mold cavity has a first surface for forming a second surface on the bolt holding portion, the second surface for supporting the pin on a cross arm of the pole, the bolt extending through the first surface and out of the mold cavity.

21. The pin of claim 9, wherein the plastic comprises fiber-reinforced nylon.

22. The pole of claim 10, wherein the body has a tapered portion between the connector and the frangible portion, the tapered portion being widest in proximity to the frangible portion.

23. The pole of claim 10, wherein the pole has a passage, the elongate support extending through the passage, the frangible portion outside the passage.

24. The pin of claim 1, wherein the elongate support holding portion has a surface for mounting the pin on a pole, the elongate support extending from the surface for mounting, the pin having conical or pyramidal protuberances on the surface for resisting turning of the pin during installation.

25. The pole of claim 10, further comprising a wooden cross arm, wherein the elongate support holding portion has a surface for mounting the pin on the cross arm, the pin having conical or pyramidal protuberances on the surface embedded into the cross arm.

* * * * *